(12) United States Patent
Yuan

(10) Patent No.: US 10,776,024 B2
(45) Date of Patent: Sep. 15, 2020

(54) SOLID STATE DRIVE AND DATA ACCESSING METHOD THEREOF

(71) Applicant: ADATA TECHNOLOGY CO., LTD., New Taipei (TW)

(72) Inventor: Kuo-Hua Yuan, Hsinchu (TW)

(73) Assignee: ADATA TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/249,846

(22) Filed: Jan. 16, 2019

(65) Prior Publication Data

US 2020/0142620 A1    May 7, 2020

(30) Foreign Application Priority Data

Nov. 7, 2018  (TW) .............................. 107139528 A

(51) Int. Cl.
*G06F 3/06*    (2006.01)
(52) U.S. Cl.
CPC .......... *G06F 3/0632* (2013.01); *G06F 3/0604* (2013.01); *G06F 3/0659* (2013.01); *G06F 3/0679* (2013.01)
(58) Field of Classification Search
CPC .... G06F 3/0632; G06F 3/0604; G06F 3/0679; G06F 3/0659
See application file for complete search history.

(56) References Cited

U.S. PATENT DOCUMENTS

| 2008/0147968 | A1 | 6/2008 | Lee et al. | |
| 2009/0193184 | A1 | 7/2009 | Yu et al. | |
| 2013/0254458 | A1 | 9/2013 | Pittelko | |
| 2014/0095827 | A1* | 4/2014 | Wei | G06F 12/0246 711/203 |
| 2015/0186262 | A1* | 7/2015 | Lin | G06F 11/1435 711/103 |
| 2015/0193302 | A1* | 7/2015 | Hyun | G11C 29/52 714/764 |
| 2017/0068451 | A1* | 3/2017 | Kenan | G06F 3/0613 |
| 2017/0123666 | A1 | 5/2017 | Sinclair et al. | |
| 2017/0177258 | A1* | 6/2017 | Bates | G06F 3/0629 |
| 2018/0004416 | A1* | 1/2018 | Okita | G06F 3/061 |
| 2018/0059936 | A1* | 3/2018 | Harada | G06F 11/1048 |

(Continued)

FOREIGN PATENT DOCUMENTS

TW         201518945 A      5/2015

*Primary Examiner* — Hiep T Nguyen
(74) *Attorney, Agent, or Firm* — Li & Cai Intellectual Property (USA) Office

(57) ABSTRACT

A method for accessing data by a solid state disk is provided, which includes steps of: configuring at least one NAND die to be dedicated for writing random data and other NAND dies to be dedicated for writing sequential data; configuring one of the NAND dies dedicated for writing the sequential data to include memory cells each of which is allowed to be used for storing a data stream having the maximum number of bits; configuring one of the NAND dies dedicated for writing the random data to include memory cells each of which is used for storing a data stream having the number of bits that is smaller the maximum number of the bits; and determining the total number of the bits of one of the data streams of the random data written by the NAND dies and accordingly reconfiguring the NAND dies.

9 Claims, 5 Drawing Sheets

(56) References Cited

U.S. PATENT DOCUMENTS

2018/0129440 A1* 5/2018 Bandic .................. G06F 3/0604
2018/0157414 A1* 6/2018 Tanaka ................... G06F 3/061
2018/0211708 A1   7/2018 Igahara et al.
2019/0377508 A1* 12/2019 Bahar ................... G06F 3/0616
2019/0377681 A1* 12/2019 Hodes ................. G06F 12/0871

* cited by examiner

SOLID STATE DRIVE AND DATA ACCESSING METHOD THEREOF

CROSS-REFERENCE TO RELATED PATENT APPLICATION

This application claims the benefit of priority to Taiwan Patent Application No. 107139528, filed on Nov. 7, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method of accessing data by a memory storage device and a solid state drive using the same.

BACKGROUND OF THE DISCLOSURE

In the recent years, with the rapid development of the electronic products, the demand for the storage mediums have increased rapidly. The rewritable non-volatile memory has characteristics such as non-volatility of data, power saving, small volume, non-mechanical structure, fast reading and writing speed, and so on. The solid state drive (SSD) is a memory storage device including a flash memory as a storage medium.

When a space of physical erasing units in an idle region is substantially occupied during the operation of the memory storage device, a storage control circuit of the memory storage device transmits valid data in at least one of the physical erasing unit in the data region to be stored in an unusable physical programmable unit of another physical erasing unit in the data region. The storage control circuit of the memory storage device then executes an erase operation on the physical erasing unit storing only invalid data and classifies the erased physical erasing unit to the idle region, such that the physical erasing units can be alternately used for storing data in response to the subsequently executed writing instruction. In order to prevent the space of the physical erasing units in the idle region from being substantially occupied, when the capacity of the physical erasing units in the idle region is reduced to be lower than a garbage collection threshold, the storage control circuit executes a data merging program such that the data in the physical erasing units become invalid data. The physical erasing unit storing only the invalid data is reclassified to the idle region. For example, when the data merging program is executed, the storage control circuit needs to use at least one empty physical erasing unit. Therefore, the garbage collection threshold needs to be larger than a minimum threshold. However, it takes a lot of time to execute the data merging program. More specifically, when the host system requires a large amount of data to be written in a short time and the space of the physical erasing units in the idle region is substantially occupied, a large amount of time is required for the storage control circuit of the memory storage device to execute the data merging program. As a result, the data cannot be written at a predetermined time and the stored data may suffer loss.

In addition, when the solid state disk synchronously executes tasks, the consumed system resources may cause the host system to have an unstable operation speed. Under normal circumstances, even if the speed of the autonomous host system temporarily drops, the program of writing the non-sequential data will not be affected. However, for a storage carrier that must execute the program of writing the sequential data, for example, playing a movie device or a digital camera, etc., the temporary slowdown of the above host system may cause the image to drop frames.

Taiwan Patent No. TW201518945A discloses that the physical erasing units of the rewritable non-volatile memory storage device are classified into the data region and the idle region. The logical units are configured to be mapped with the physical erasing units in the data region. The rewritable non-volatile memory storage device is dynamically configured to include the predetermined number of the physical erasing units dedicated for writing the sequential data. When a command sequence sent by the host system indicates that the sequential data and the random data is written to the same die in the solid state hard disk, mutual interference may occur. Accordingly, the above conventional methods of writing the data are not optimized for a large amount of the sequential data.

SUMMARY OF THE DISCLOSURE

The present disclosure provides a solid state drive and a data accessing method thereof, which can improve an unstable data accessing speed, thereby preventing images from being dropped out.

One main object of the present disclosure is to provide a method for accessing data by a solid state disk. The method includes the following steps: providing an instruction for instructing to configure at least one of a plurality of NAND dies at a chip enable terminal to be dedicated for writing random data and the other NAND dies to be dedicated for writing sequential data when the random data and the sequential data are allowed to be written; configuring one of the NAND dies dedicated for writing the sequential data to include memory cells each of which is allowed to be used for storing a data stream having the maximum number of bits at a top level among a plurality of memory cell levels; configuring one of the NAND dies dedicated for writing the random data to include memory cells each of which is at a lower level than the top level among the memory cell levels and used for storing a data stream having the number of bits that is smaller the maximum number of the bits at the top level; and determining the total number of the bits of one of the data streams of the random data written by the NAND dies and accordingly reconfiguring the NAND dies to include the memory cells at different levels.

Another main object of the present disclosure is to provide a solid state disk. The solid state disk includes a memory storage device, an address storage and a main controller. The memory storage device includes a plurality of NAND dies. The address storage is configured to store an address of a storage block intending to execute a program in the memory storage device and erase the address according to an address erasing command. The main controller is connected to the address storage and the memory storage device. The main controller is configured to execute programs of: providing an instruction for instructing to configure at least one of a plurality of NAND dies at a chip enable terminal to be dedicated for writing random data and the other NAND dies to be dedicated for writing sequential data when the random data and the sequential data are allowed to be written; configuring one of the NAND dies dedicated for writing the sequential data to include memory cells each of which is allowed to be used for storing a data stream having the maximum number of bits at a top level among a plurality of memory cell levels; configuring one of the NAND dies dedicated for writing the random data to include memory cells each of which is at a lower level than the top level among the memory cell levels and used for storing a data stream having the number of bits that is smaller than the maximum number of the bits at the top level; and determining the total number of the bits of one of the data streams of the random data written by the NAND dies and accordingly reconfiguring the NAND dies to include the memory cells at different levels.

As described above, the present disclosure, compared with the related art, has the advantage that the sequential data is not confused with the random data such that the sequential data and the random data is correctly written.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1A:
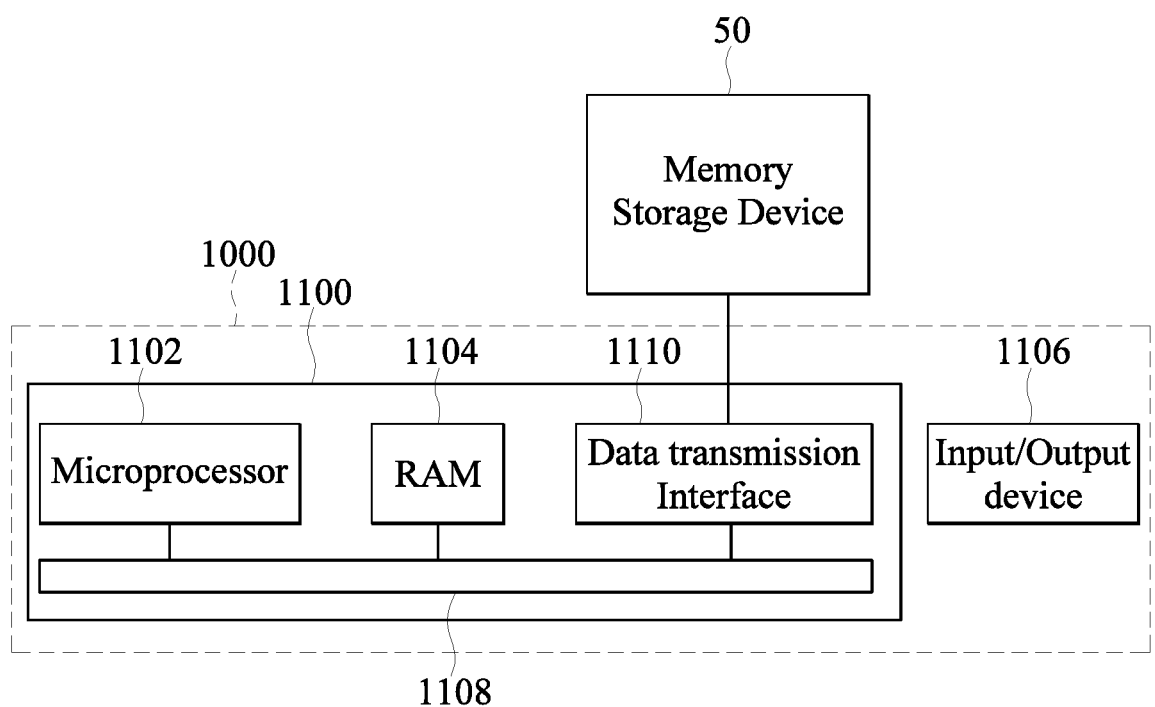
FIG. 1A is a block diagram of a host system and a memory storage device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1A is a block diagram of a host system and a memory storage device according to an embodiment of the present disclosure.

Reference is made to FIG. 1A, a host system 100 includes a computer 1100 and an input/output device 1106. The computer 1100 includes a microprocessor 1102, a random access memory (RAM) 1104, a system bus 1108 and a data transmission interface 1110. In the embodiment, a memory storage device 50 is connected to the components of the host system 1000 via the data transmission interface 1110. Data may be written to or read from the memory storage device 50 by the microprocessor 1102, the random access memory 1104 and the input/output device 1106. For example, the memory storage device 50 may be a rewritable non-volatile memory storage device such as a flash drive, a memory card, or a solid state drive (SSD). The host system 1000 may be used for controlling the memory storage device 50 to store the data.

Figure 1B:
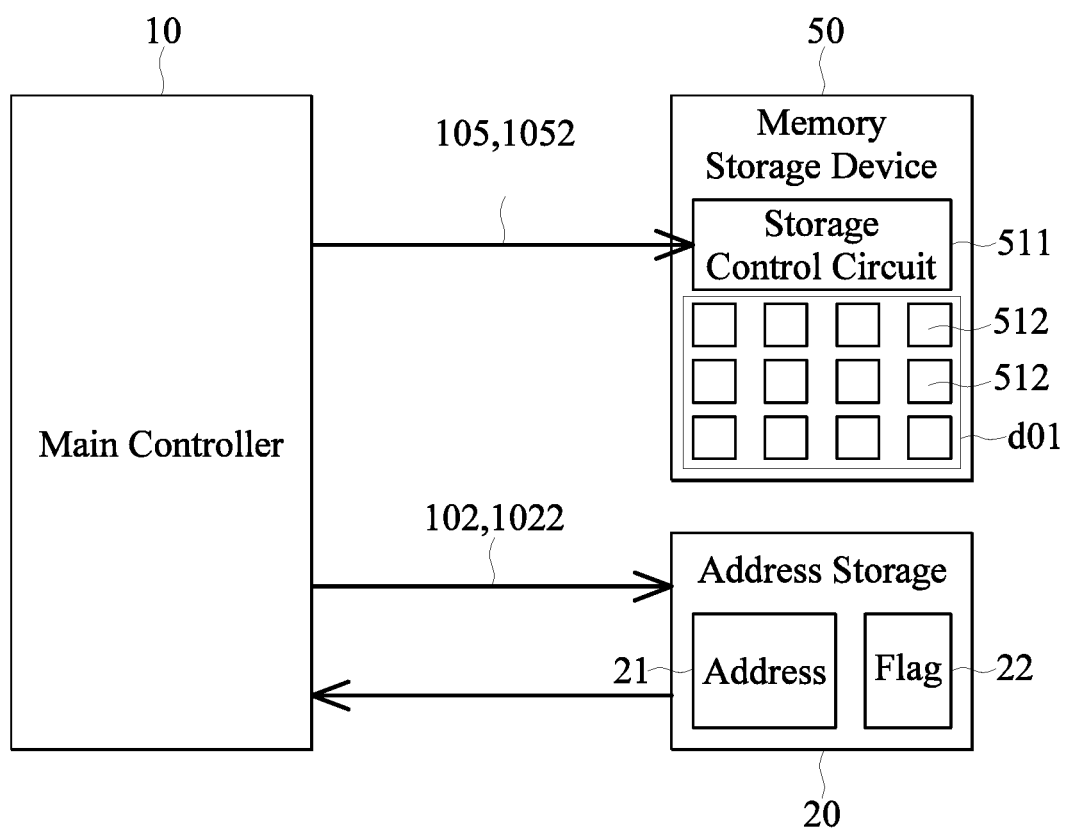
FIG. 1B is a block diagram of the memory storage device accessing data according to the embodiment of the present disclosure.

Reference is made to FIG. 1B, which is a block diagram of the memory storage device accessing data according to the embodiment of the present disclosure.

As shown in FIG. 1B, the solid state disk for accessing the data includes a main controller 10, an address storage 20 and the memory storage device 50. The main controller 10 is connected to the address storage 20 and the memory storage device 50. For example, the main controller 10 may be a main controller of the solid state disk. The address store 20 may be a flash memory such as a flash memory having a serial peripheral interface or other memory storage device having a function of temporarily or permanently storing the data. The memory storage device 50 may be a NAND or NOR flash memory device or other memory storage device having a storing function. However, it should be noted that the present disclosure is not limited to the above examples.

With the development of the solid state disk technology, more and more flash chips need to be accommodated in the memory storage device 50 including the main controller and the flash chips. The single flash chip includes a plurality of NAND dies via a stackable package technology.

The host system 1000 may include a plurality of NAND flash chips having a plurality of enable signals based on a solid state disk (SSD) technology for the NAND flash chips such that a capacity and a performance of a product can be improved. Each of the dies on the NAND flash chips has a chip enable terminal. When each of the dies is driven, the chip enable signal that is distinguished from other instructions for the chips/dies in the memory storage device 50 needs to be applied to each of the dies. As a result, the main controller 10 needs to consume a large amount of input/output resources for the chip enable signals.

The conventional memory cell includes one or more steer transistor for accessing the dies. The steer transistor may be turned on such that the memory cell can access the data transmitted through a word line and a bit line. That is, the die is used as a conductive gate to allow the data to be written to or read from the memory cell. The conventional ovonic unified memory (OUM) cell made of chalcogenide needs to be programmed by applying a current higher than a current applied for an instruction and a voltage higher than a voltage applied for the instruction.

The memory storage device 50 includes a storage control circuit 511 and a storage block 512 of a certain die d01. The main controller 10 is configured to control an overall operation of the storage control circuit 511.

A host interface is coupled to the storage control circuit 511 and is configured to receive and identify the instruction and the data transmitted by the host system 1000. That is, the instructions and the data transmitted by the host system 1000 are transmitted to a memory management circuit through the host interface. In the embodiment, the host interface is compatible with the SATA standard.

However, those skilled in the art should understand that, the host interface may comply with the parallel advanced technology attachment (PATA) standard, the Institute of Electrical and Electronic Engineers (IEEE) 1394 standard, the high-speed Peripheral Component Interconnect Express (PCI Express) standard, the Universal Serial Bus (USB) standard, the Ultra High Speed-I (UHS-I) interface standard, the Ultra High Speed-II interface standard (UHS-I I), the Secure Digital (SD) interface standard (SD), the Memory Stick (MS) interface standard, the Multi Media Card (MMC) interface standard, the Compact Flash (CF) interface standard, the Integrated Device Electronics (IDE) standard or other suitable standards, but the present disclosure is not limited thereto. In the embodiment, the host interface may be packaged in the same chip together with the storage control circuit or disposed outside a chip including the storage control circuit.

Specifically, the storage control circuit 511 has a plurality of control commands. The control commands are executed for instructing the memory storage device 50 to write, read and erase the data or other programs.

The certain die d01 includes storage pages, storage blocks and storage planes for the internal transistors therein. By arranging a plurality of storage pages in row/column locations respectively, some of the storage pages are grouped into one storage block, and the plurality of storage blocks constitute a plurality of storage planes. In the embodiment, the NAND die may include the plurality of storage planes each including the plurality of storage blocks, wherein each of the storage blocks includes the plurality of storage pages.

The number of the storage blocks 512 may be plural. For example, in the embodiment, the number of the storage blocks 512 is twelve and the storage blocks 512 are arranged in the storage plane having 3 rows and 4 columns. It should be understood that the type of the memory storage device 50, the number of the dies included in the memory storage device 50, the number and an arrangement of the storage blocks 512, and the amount of the data that can be accessed by the storage blocks 512 may be adjusted according to actual requirements.

The physical erasing units may belong to the same or different dies. Each of the physical erasing units has a plurality of physical programmable units. The data may be written respectively to and erased simultaneously from the physical programmable units of the same physical erasing unit. Each of the physical erasing units may include 64, 256 or the certain number of the physical programmable units, but the present disclosure is not limited thereto.

The wear leveling technology is one of the erasing technologies with respect to writing technologies for NAND dies. The block of the flash memory has a limited number of writing and erasing times. When the erasing and writing programs are executed on the same block multiple times, the flash memory may have a lower reading speed, and even the flash memory may be damaged and inoperable. The flash memory uses the wear leveling technology such that the storage blocks thereof can be evenly used, thereby avoiding excessive use of some of the storage blocks, which may lead to damage of said storage blocks. The wear leveling technology is executed on a plurality of sections of the flash memory medium such that the issue of uneven wear on the sections of the flash memory medium can be improved. The wear leveling technology may be built into a firmware of the main controller 10. A file system is made clear by establishing a file partition table between a logical section and a physical section of the flash memory medium. In principle, the wear leveling algorithm enables all of the sections on the flash memory medium to reach their endurance limits almost simultaneously, thereby extending a lifetime of the flash memory medium.

In the embodiment, the storage control circuit 511 may execute the wear leveling algorithm on all of the NAND dies such that the storage blocks of each of the dies in the flash memory are evenly used.

The physical erasing units in the idle region and the physical erasing units in the data region are alternately used. Specifically, the data that has been written to the physical erasing unit must be erased before other data is written to the physical erasing unit. Therefore, the physical erasing units in the idle region are configured to write a random data and used in place of with the physical erasing units mapped to the logical blocks. For example, when a logical access address of the random data to be written by the host system 1000 corresponds to one of the logical pages of one of the logical blocks of the memory storage device, the storage control circuit of the memory storage device selects one or more of the physical erasing units in the idle region, and the random data is written to the physical programmable units of the selected physical erasing units. The physical erasing unit to which the random data is written is classified to the data region by the storage control circuit.

Accordingly, the physical erasing unit in the idle region is an empty or usable physical erasing unit. That is, the physical erasing unit in the idle region does not have recorded data or only has invalid data. That is, the physical programmable units of the physical erasing units in the data region and the idle region are alternately used for the logical page of the logical block to store the data written by the host system 1000.

The flash memory storage device includes the plurality of physical erasing units each including the plurality of physical programmable units. The data is written to the physical erasing unit in an order of the physical programmable units. In addition, the data that has been written to the physical programmable unit must be erased before other data is written to the physical programmable unit. The physical programmable unit is a smallest unit on which the erasing program is executed. Therefore, the physical erasing units are classified to the data region and the idle region in management of the flash memory storage device.

The physical erasing units in the data region are used to store data. Specifically, the storage control circuit 511 of the memory storage device determines the logical page of the logical block according to the accessed logical address, and maps the logical page of the logical block to the physical programmable unit of the physical erasing unit in the data region. That is, the flash memory storage device determines that the physical erasing unit in the data region has been used. For example, the storage control circuit 511 may use a logical-to-physical address mapping table to record mapping relationships between the logical blocks and the physical erasing units in the data region. The logical pages in the logical blocks correspond to the physical programmable units of the mapped physical erasing units.

The main controller 10 may provide new data 105 to the memory storage device 50. The new data 105 is represented by a single bit or a data stream having a plurality of bits that can be accessed by the memory cell.

Each of the memory cells can store one or more data bits. The memory cell is determined as a single-level cell (SLC), a multi-level cell (MLC), a triple-level cell (TLC), a quad-level cell (QLC) or other types of memory cells, according to the number of the bits that can be stored in the memory cell. In the embodiment, for example, the rewritable non-volatile memory storage device 50 may be a multi-level cell (MLC) NAND flash memory storage device, which can used for storing two data bits. Alternatively, the rewritable non-volatile memory storage device 50 may be a single-level cell (SLC) NAND flash memory storage device, which can used for storing one data bit. Alternatively, the rewritable non-volatile memory storage device 50 may be a triple-level cell (TLC) NAND flash memory storage device, which can used for storing three data bits. It should be understood that the present disclosure is not limited to the above examples. In practice, the memory storage device 50 may be other types of flash memory storage devices or other memory storage devices that may have the same characteristics in different applications.

The capacity of the memory cell being the single-level cell (SLC) may be only one third of the capacity of the memory cell being the triple-level cell (TLC). However, the main controller 10 may generate less pressure on the single-level cell and have faster reading and writing speeds. The capacity of the memory cell being the multi-level cell (MLC) is twice the capacity of the memory cell being the single-level cell (SLC). However, the main controller 10 may generate less pressure on the memory cell being the multi-level cell (MLC) and has faster reading and writing speeds than the memory cell being the triple-level cell (TLC).

When or after the main controller 10 provides the new data 105, the main controller 10 may output an address storing instruction 102 to the address storage 20 to instruct the address storage 20 to store a program to be executed according to the address storing instruction 102. For example, the main controller 10 instructs the address storage 20 to store an address 21 of the storage blocks 512 accessing the new data 105 in the memory storage device 50. The address 21 corresponds to the row/column location of the storage blocks 512 on the plane.

Alternatively, a different type of the new data 105 may be written simultaneously or sequentially to the storage blocks 512 of the memory storage device 50. Specifically, the writing of the new data 105 may be executed in a sequential writing mode or a random writing mode, according to characteristics of the new data 105.

Multiple pieces of data may be sequentially written to contiguous logical pages in the sequential writing mode. Multiple pieces of data may be written to non-contiguous logical pages in the random writing mode. As used herein, the data written in the sequential writing mode is referred to as a sequential data and the data written in the random writing mode is referred to as the random data.

The controller 10 determines whether the new data 105 is the sequential data or the random data as described in detail below.

When a contiguous logical unit is indicated by a command sequence in a dynamic random access memory data buffer region included in the main controller 10 for a continuous period of time, the main controller 10 determines that the sequential data is written. Conversely, when the non-contiguous logical unit is indicated by the command sequence, the main controller 10 determines that the random data is written.

Alternatively, the main controller 10 determines whether the sequential data or the random data is written according to the command sequence sent by the host system 1000.

Alternatively, the main controller 10 determines whether the sequential data or the random data is written according to a file size of the written data according to the instruction of the command sequence.

In order to solve an image dropout phenomenon resulted from an unstable data access program of the conventional solid state disk, in the embodiment, an entire space in the memory storage device 50 is dynamically divided into two different spaces. The random data is written to one of the divided spaces by the main controller 10. The sequential data is written to the other divided space by the main controller 10. This ensures that the sequential data and the random data will not be mixed together.

The two different types of the data may be stored in the different storage blocks. One of the NAND dies may include two storage blocks. The sequential data may be written to one of the storage blocks and the random data may be written to the other storage blocks. Once the used capacity of the storage block reaches a capacity threshold, a new storage block may be configured for the next piece of data.

In the embodiment, if very few random data is included in the new data 105, the random data is accessed by only one of the NAND dies and the sequential data is written to the remaining space. For example, the memory storage device 50 may include a plurality of NAND dies d01, d02, d03 to d0$n$ and the main controller 10. The main controller 10 configures at least one of the NAND dies dedicated for writing the random data and the other NAND dies dedicated for writing the sequential data when the random data and the sequential data is allowed to be written, according to the instruction from the host system 1000.

In the embodiment, the at least one NAND dies dedicated for writing the random data includes the plurality of storage planes each including the plurality of storage blocks, wherein each of the storage blocks includes the plurality of storage pages. The main controller 10 configures one of the storage blocks of one of the storage planes to be available for writing the sequential data. The appropriate types of the NAND dies may be configured according to the characteristics of the data to be written. For example, the data of the file system is usually written in the random writing mode. The NAND dies may be configured as the single-level cell (SLC) to prevent the data from being lost when an abnormal power failure occurs. Multimedia data is usually written in the sequential writing mode. The NAND dies may be configured as the triple-level cell (TLC) for a very large amount of data of multimedia files. In the embodiment, one of the NAND dies dedicated for writing the sequential data is configured to include the memory cells each of which is allowed to be used for storing a data stream having the maximum number of the bits at a top level among a plurality of memory cell levels, for example, 4 bits. One of the NAND dies dedicated for writing the random data is configured to include the memory cells each of which is at a lower level than the top level among the memory cell levels and used for storing the data stream having the number of the bits such as 3 bits, 2 bits or 1 bit, which is smaller the maximum number of the bits at the top level. In order to make better use of the space available for writing the random data, the total number of the bits of one of the data streams of the random data written by the NAND dies is determined, and the NAND dies are accordingly reconfigured to include the memory cells at different levels.

In the embodiment, if the total number of the bits of one of the data streams in the NAND die exceeds a preset maximum random data number, it means that more space is required for accessing the new data 105 that is the random data. Under this condition, the main controller 10 may send an instruction that is, for example, associated with a set feature, to configure the NAND die to include the memory cells at a higher level that has the larger capacity.

Conversely, if the total number of the bits of one of the data streams in the NAND die is smaller than a preset minimum random data number, it means that there is no need to provide too much space for accessing the new data 105 that is the random data. Under this condition, the main controller 10 may send an instruction that is, for example, associated with the set feature, to configure the NAND die to include the memory cells at a lower level that has the smaller capacity.

Correspondingly, the addresses 21 corresponding to the storage blocks 512 intending to access the new data 105 or execute other programs are written to address storage blocks of the address storage 20.

In addition, the address storage 20 may configure one or more flags 22 corresponding to the one or more addresses 21 of the one or more storage blocks 512 of the memory storage device 50, according to the address storing instruction 102 from the main controller 10.

For example, the flags 22 may include a status flag, a control flag, etc., or a combination thereof. The flags 22 may indicate storing states of the addresses 21 of the storage blocks 512. That is, the flags 22 may include an indication for indicating whether the address 21 of each of the storage blocks 512 is still stored in the address storage 20, and an indication for indicating that the address 21 of each of the storage blocks 512 is written to which one of the address storage blocks and the address of the address storage block.

The main controller 10 may output a programmable instruction 1052 after determining that the address storage 20 has stored the address 21 of the storage block 512. When the storage control circuit 511 of the memory storage device 50 receives the programmable command 1052, the storage block 512 of the memory storage device 50 may be programmed according to the programmable command 1052 of the main controller 10. That is, the storage block 512 is controlled to execute programs. For example, the storage block 512 reads the new data 105 from the main controller 10 and then writes the new data 105 to the storage block 512.

Optionally, the original data previously stored in the storage block 512 is erased before accessing the new data 105.

When the main controller 10 determines that the memory storage device 50 has executed the program, for example, it has accessed the new data 105, the main controller 10 may output an address erasing command 1022 to the address storage 20 to instruct the address storage 20 to erase the address 21 and the flag 22 of the storage block 512 according to an instruction of the address erasing command 1022.

Ideally, after the storing operation is completed as described above, the address 21 and the flag 22 of the storage block 512 of the memory storage device 50 are erased.

Figure 2:
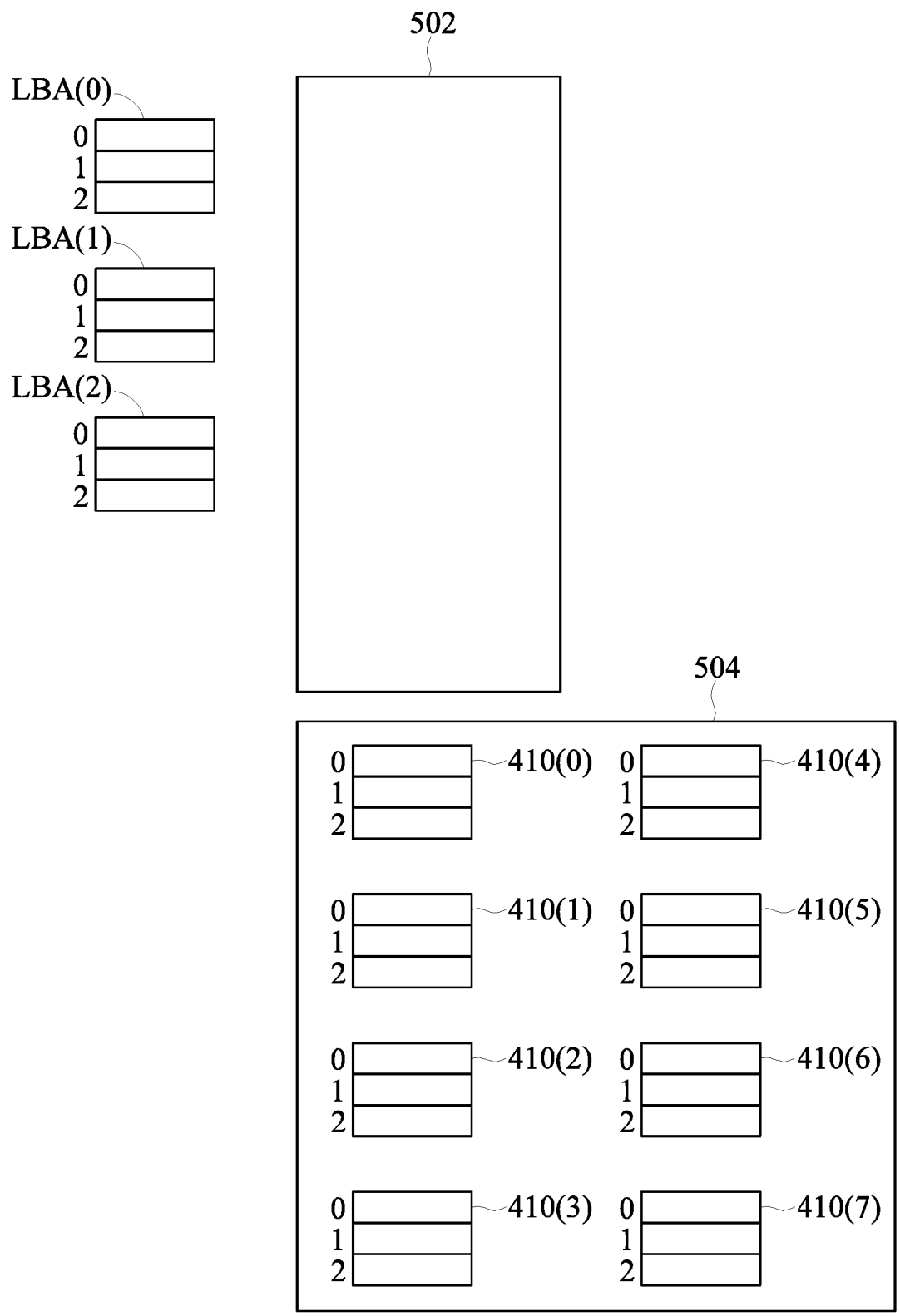
FIG. 2 is a schematic diagram of writing random data by using a random writing mechanism according to an embodiment of the present disclosure.

FIG. 2 is a schematic diagram of writing random data by using a random writing mechanism according to an embodiment of the present disclosure. Reference is made to FIG. 2, for convenience of explanation, it is assumed that a data region 502 of the NAND die dedicated for writing the random data is not initially mapped to the physical erasing unit of the logical unit. Eight physical erasing units each having three physical programmable units are located in an idle region 504 of the NAND die dedicated for writing the random data. The data must be written to the physical erasing units in the order of the physical programmable units. For example, the three physical erasing units are reserved for writing the sequential data, wherein two of the physical erasing units are alternately used for writing the sequential data and one of the physical erasing units is reserved for executing a data combining program. Therefore, a garbage collection threshold may be initially set as 4, and the capacity mapped by the logical unit may be set to have the capacity of the three physical erasing units. That is, it is desirable that the memory storage device 50 having the eight physical erasing units can only provide the capacity of the six physical erasing units to the host system 1000. After retaining the physical erasing units dedicated for writing the sequential data, the host system 1000 only has the capacity of the three physical erasing units for accessing the data. The host system 1000 determines that the memory storage device 50 only has the capacity of the three physical erasing units, i.e. logical units LBA(0) to LBA(2). In the embodiment, the capacity of the logical units depends on the number of the physical erasing units dedicated for writing the sequential data, but the present disclosure is not limited thereto. The capacity of the physical erasing units dedicated for writing the sequential data may be smaller than the capacity of the logical units.

In another embodiment, the main controller 10 may configure the plurality of storage blocks in one of the storage planes, or one, two, or the desired number of the physical erasing units to be available for writing the sequential data, in at least one of the NAND dies dedicated for writing the random data.

In yet another embodiment, at least one of the NAND dies dedicated for writing the random data may be reconfigured by the main controller 10 such that, during a garbage collection process, the physical erasing unit storing only the invalid data in the data region 502 is reclassified to the idle region 504.

Figure 3:
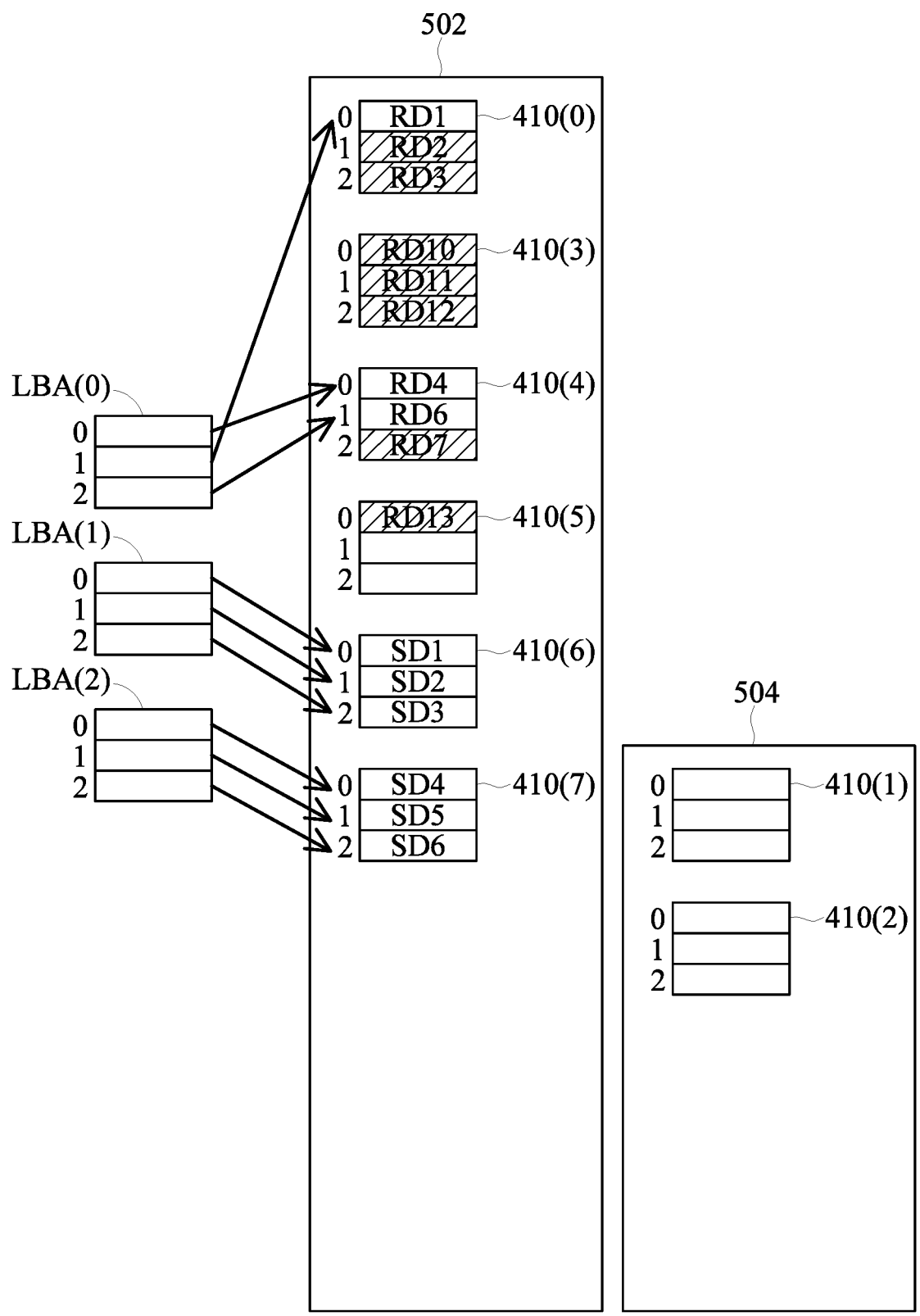
FIG. 3 is a schematic diagram of writing sequential data by using a sequential writing mechanism according to an embodiment of the present disclosure.

FIG. 3 is a schematic diagram of writing sequential data by using a sequential writing mechanism according to an embodiment of the present disclosure. Reference is made to FIG. 3, the sequential data SD1 to SD6 is to be programmed and the sequential data SD1 to SD6 is on 0th to 2th logical pages of a logical unit LBA(1) and 0th to 2th logical pages of a logical unit LBA(2). The three physical erasing units are reserved for writing the sequential data in the idle region 504 of the NAND dies dedicated for writing the random data. Therefore, the storage control circuit 511 extracts empty physical erasing units such as physical erasing units 410(6) and 410(7) from the idle region 504 of the NAND die dedicated for writing the random data. The storage control circuit 511 issues a programmable instruction to sequentially write the sequential data SD1 to SD6 to the physical erasing units 410(6) and 410(7) and classifies the physical erasing units 410(6) and 410(7) to the data region 502 in which the NAND dies dedicated for writing the random data are configured. In addition, the storage control circuit 511 marks 0th to 2th physical programmable units of a physical erasing unit 410(0), 0th to 2th physical programmable units of a physical erasing unit 410(3) and 0th physical programmable units of a physical erasing unit 410(5) as invalid.

Figure 4:
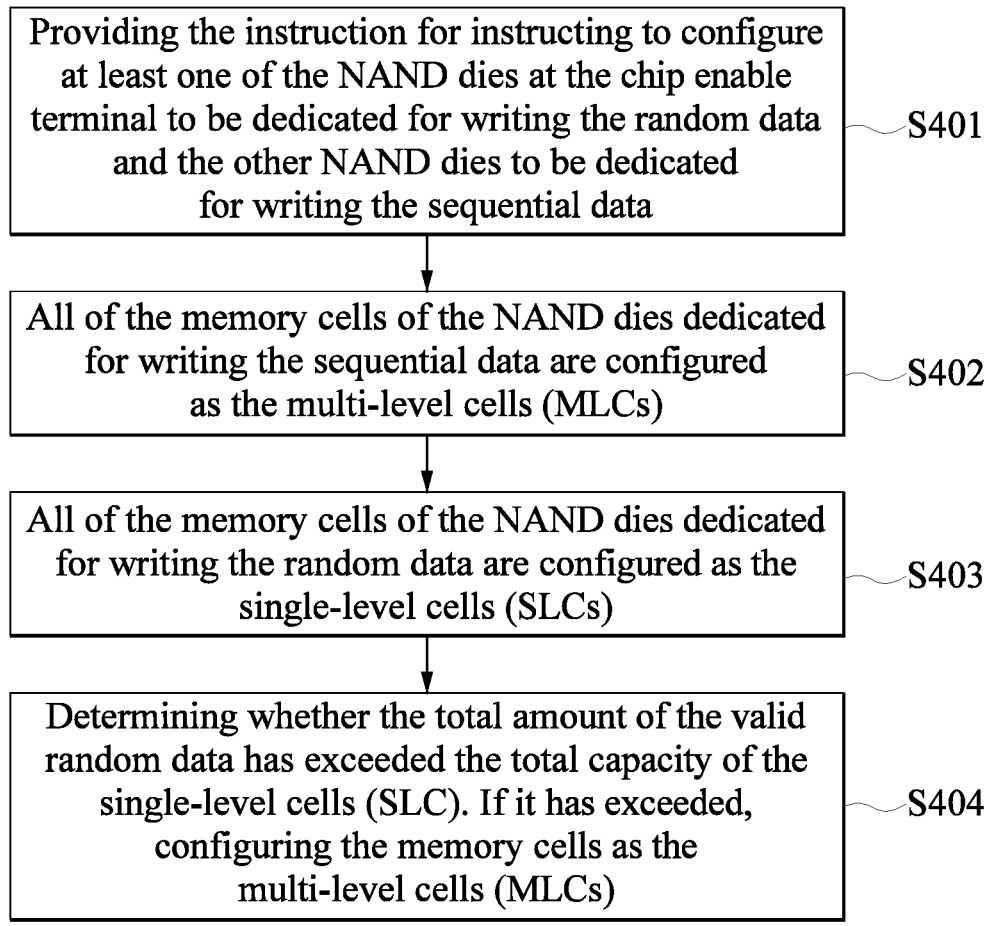
FIG. 4 is a flowchart diagram of a method of accessing data by a solid state disk.

Reference is made to FIGS. 1A, 1B and 4, wherein FIG. 4 is a flowchart diagram of a method of accessing data by a solid state disk.

In step S401, the host system 1000 provides an instruction for determining whether the new data 105 is the sequential data or the random data. The host system 1000 may determine whether the new data 105 is the sequential data or the random data by using the following three manners.

When the contiguous logical unit is indicated by the command sequence in the dynamic random access memory data buffer region included in the main controller 10 for the continuous period of time, the main controller 10 determines that the sequential data is written. Conversely, when the non-contiguous logical unit is indicated by the command sequence, the main controller 10 determines that the random data is written.

Alternatively, the main controller 10 determines that the sequential data or the random data is written according to the command sequence sent by the host system 1000.

Alternatively, the main controller 10 determines whether the sequential data or the random data is written according to the file size of the data to be written according to the instruction of the command sequence.

The main controller 10 then configures at least one of the NAND dies to be dedicated for writing the random data and the other NAND dies to be dedicated for writing the sequential data such that the new data 105 can be written, according to functions of the chip enable terminals provided by the dies d01, d02, d03 to d0n on the NAND flash chip.

In step S402, in an embodiment, one of the NAND dies dedicated for writing the sequential data includes the memory cells in which the data streams each having the maximum allowable bit number of the quad-level cell (QLC) such as 4 bits may be stored. In an embodiment, the memory cells of the NAND dies dedicated for writing the sequential data are configured as the multi-level cells.

In step S403, one of the NAND dies dedicated for writing the random data includes the memory cells, in which the data streams having the number of the bits such as three bits, two bits or one bit that is smaller than the maximum allowable bit number of the quad-level cell (QLC) are stored. In an embodiment, the memory cells of the NAND dies dedicated for writing the random data are configured as the single-level cells (SLCs).

In step S404, in order to make better use of the space available for writing the random data, the NAND dies are reconfigured to include the memory cells at different levels according to the total number of the bits of one of the data streams of the random data written by the NAND dies. In an embodiment, it is determined whether or not the amount of the random data has exceeded the total capacity of the single-level cells (SLC). If the total capacity has been exceeded, the memory cells are configured as the multi-level cells (MLCs).

In summary, the present disclosure has the advantage over related art that the sequential data will not be confused with the random data, such that the sequential data and the random data can be correctly written. It is worth noting that, in the present disclosure, the sequential data and the random data is stored respectively in the different dies. The programs for writing the sequential data and the random data to the NAND dies may be executed at the same time without interfering with each other. Therefore, the program of writing the random data does not affect the program of writing the sequential data to prevent the stored image data from dropping out.

Furthermore, the appropriate types of the NAND dies may be configured according to the characteristics of the data to be written. For example, the data of the file system is usually written in the random writing mode. The NAND dies may be configured as the single-level cell (SLC) to prevent data from being lost when an abnormal power failure occurs. Multimedia data is usually written in the sequential writing mode. The NAND dies may be configured as the triple-level cells (TLCs) for the very large amount of data of multimedia files. In this way, the storage space of the solid state disk can be better utilized in different data writing modes.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for accessing data in a solid state disk, comprising the following steps:
    providing an instruction, by a main controller, for instructing to configure at least one of a plurality of NAND dies at a chip enable terminal included in a memory storage device to be dedicated for writing random data and the other NAND dies to be dedicated for writing sequential data when the random data or the sequential data is allowed to be written;
    configuring one of the NAND dies dedicated for writing the sequential data to include memory cells each of which is allowed to be used for storing a data stream having the maximum number of bits at a top level among a plurality of memory cell levels;
    configuring one of the NAND dies dedicated for writing the random data to include memory cells each of which is at a lower level than the top level among the memory cell levels and used for storing a data stream having the number of bits that is smaller the maximum number of the bits at the top level; and
    determining the total number of the bits of one of the data streams of the random data written by the NAND dies and accordingly reconfiguring the NAND dies to include the memory cells at different levels;
    wherein reconfiguring at least one of the NAND dies to which the random data is written by the main controller during a garbage collection process so that a physical erasing unit storing in a data region can be reclassified to an idle region.

2. The method of claim 1, wherein the NAND die includes a plurality of storage planes each including a plurality of storage blocks, and each of the storage blocks includes a plurality of storage pages.

3. The method of claim 2, further comprising a step of:
configuring one of the storage blocks of one of the storage planes in the at least one NAND die dedicated for writing the random data to be allowed to be used for writing the sequential data by a main controller of the solid state disk.

4. The method of claim 1, further comprising a step of:
configuring the physical erasing unit in the data region to have a capacity that is smaller than or equal to a capacity of a logical unit in the solid state disk.

5. The method of claim 3, wherein the main controller further includes a dynamic random access memory data buffer region, in which a command sequence indicates that the sequential data is written to continuous logical units and the random data is written to discontinuous logical units at a continuous period of time.

6. The method of claim 3, wherein the main controller determines whether the sequential data or the random data is allowed to be written, according to a command sequence sent by a host system.

7. The method of claim 3, wherein the main controller determines whether the sequential data or the random data is allowed to be written according to a file size of the sequential data or the random data to be written according to an instruction of a command sequence.

8. The method of claim 3, further comprising a step of:
using a wear leveling algorithm to write the sequential data and the random data to the NAND dies.

9. A solid state disk, comprising:
a memory storage device including a plurality of NAND dies;
an address storage configured to store an address of a storage block intending to execute a program in the memory storage device and erase the address according to an address erasing command;
a main controller connected to the address storage and the memory storage device and configured to execute programs of:
providing an instruction for instructing to configure at least one of a plurality of NAND dies at a chip enable terminal included in the memory storage device to be dedicated for writing random data, and the other NAND dies to be dedicated for writing sequential data when the random data and the sequential data is allowed to be written;
configuring one of the NAND dies dedicated for writing the sequential data to include memory cells each of which is allowed to be used for storing a data stream having the maximum number of bits at a top level among a plurality of memory cell levels;
configuring one of the NAND dies dedicated for writing the random data to include memory cells each of which is at a lower level than the top level among the memory cell levels and used for storing a data stream having the number of bits that is smaller the maximum number of the bits at the top level; and
determining the total number of the bits of one of the data streams of the random data written by the NAND dies and accordingly reconfiguring the NAND dies to include the memory cells at different levels;
wherein reconfiguring at least one of the NAND dies to which the random data is written by the main controller during a garbage collection process so that a physical erasing unit storing in a data region can be reclassified to an idle region.

* * * * *